Figure 1:
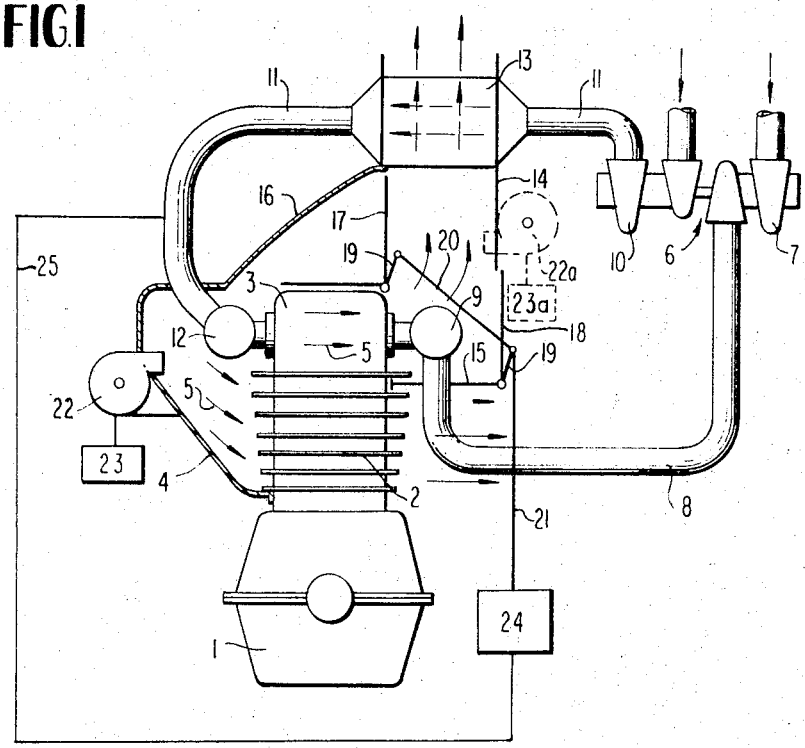

United States Patent
Scherenberg

[11] 3,728,856
[45] Apr. 24, 1973

[54] AIR-COOLED INTERNAL COMBUSTION ENGINE WITH SUPERCHARGING, ESPECIALLY MULTI-FUEL INTERNAL COMBUSTION ENGINE

[75] Inventor: Hans O. Scherenberg, Stuttgart-Heumaden, Germany

[73] Assignee: Daimler-Benz Aktiengesellschaft

[22] Filed: Feb. 11, 1971

[21] Appl. No.: 114,633

[30] Foreign Application Priority Data

Feb. 21, 1970 Germany.................P 20 08 159.8

[52] U.S. Cl.............60/13, 123/119 CD, 123/122 D, 123/179 H
[51] Int. Cl..............................F02b 37/04
[58] Field of Search................60/13; 123/119 CD, 123/122 D, 119 CA, 41.04, 41.7, 41.59, 179 H

[56] References Cited

UNITED STATES PATENTS

| 2,407,223 | 9/1946 | Caldwell | 123/122 D |
|---|---|---|---|
| 2,368,642 | 2/1945 | Crago | 60/13 |
| 2,558,797 | 7/1951 | Theiss | 60/13 |
| 3,397,684 | 8/1968 | Scherenberg | 60/13 |
| 2,897,801 | 8/1959 | Kloss | 123/122 D |
| 3,400,699 | 9/1968 | Van Kirk et al. | 123/179 H |

FOREIGN PATENTS OR APPLICATIONS

| 1,096,391 | 1/1961 | Germany | 123/119 CD |

Primary Examiner—Carlton R. Croyle
Assistant Examiner—Waren Olsen
Attorney—Craig, Antonelli, Stewart & Hill

[57] ABSTRACT

An air-cooled internal combustion engine with supercharging by means of a supercharger driven preferably by an exhaust gas turbine, particularly a multi-fuel internal combustion engine, in which a heat-exchanger is arranged in the flow of the supercharged air between the supercharger and the inlet of the internal combustion engine and in that this heat-exchanger is disposed in the discharge air flow of the air serving for the cooling of the internal combustion engine.

33 Claims, 2 Drawing Figures

PATENTED APR 24 1973 3,728,856

INVENTOR
HANS O. SCHERENBERG

BY Craig, Antonelli Stewart & Hill
ATTORNEYS

AIR-COOLED INTERNAL COMBUSTION ENGINE WITH SUPER-CHARGING, ESPECIALLY MULTI-FUEL INTERNAL COMBUSTION ENGINE

The present invention relates to an air-cooled internal combustion engine with supercharging by means of a supercharger, preferably driven from an exhaust gas turbine, and more particularly relates to an air-cooled multi-fuel internal combustion engine.

Multi-fuel internal combustion engines are, as the name implies to be operated with fuels of different composition, also with fuels which behave in such internal combustion engines in a slow or sluggish manner as regards ignition and as a result thereof make difficult the starting operation with cold engines, particularly in air-cooled multi-fuel internal combustion engines, and which also impair the operation of the internal combustion engine up to a point within a middle rotational speed range.

The present invention is concerned with the task to avoid the aforementioned disadvantages with simple means and to render an internal combustion engine with air-cooling and supercharging more utilizable for multi-fuel operation.

The underlying problems are solved according to the present invention in that a heat-exchanger is arranged in the supercharged air stream or air flow between the supercharger and the inlet of the internal combustion engine, and in that this heat-exchanger is disposed in the discharge air flow of the air serving for the cooling of the internal combustion engine.

By the supply of the heat-exchanger with the discharge air of the air used for the cooling of the internal combustion engine, one attains a heating of the supercharged air up to a point in a middle rotational speed range of the internal combustion engine to such an extent that also with the use of poorly ignitable fuels as such, a reliable ignition of these fuels and therewith a good combustion is assured. Since the supercharged charging air as a rule is warmer at higher rotational speeds than the discharged cooling air, it is further achieved that the supercharged air is cooled by the present invention in an advantageous manner within a higher rotational speed range and within a higher load range.

According to a further feature and development of the inventive measures, the heat-exchanger may also be connected to the feed or supply air stream of the cooling air in order to increase the cooling of the charging air. Advantageously, the arrangement may thereby be also made in such a manner that the heat-exchanger is adapted to be connected selectively with the discharge air stream and with the supply air stream so that up to within a middle rotational speed and load range, the charging air can be heated with the discharge air and beginning with this range it can be cooled with the fresh supply air.

In order to facilitate the starting operation, a heating apparatus may be arranged in the supply air stream of the cooling air which heats the supply air stream independently of the internal combustion engine and thus in addition to the supercharged charging air, also the cylinder block of the internal combustion engine is heated. Possibly, a heating apparatus may also be arranged in the discharge air stream of the cooling air. Such a heating apparatus can be operated at low outside temperatures during the starting operation of the multi-fuel internal combustion engine, during idling and at lower rotational speeds, and may be constructed by conventional means so as to be preferably automatically engageable and disengageable.

According to a further feature of the present invention, an installation adapted to be heated by the exhaust gases of the internal combustion engine may be arranged in the discharge air stream of the cooling air conducted to the heat-exchanger in order to utilize advantageously also the exhaust gas heat for the heating of the supercharged air. The exhaust gas manifold of the internal combustion engine may be arranged in a structurally and functionally favorable manner within the discharge air stream of the cooling air.

In an advantageous manner, a tank may be provided which collects the discharge air coming from the cylinder head of the internal combustion engine and which conducts the discharge air of the cooling air through a connecting line to heat-exchanger. A line bypassing the cylinder head and connected with the cooling air feed line upstream of the internal combustion engine may terminate in this connecting line and a valve such as a damper or flap, may be provided which in one position closes the connecting line from the tank collecting the cooling-air discharge air and which in another position closes the discharge in the connecting line of the line connected to the cooling air feed line; furthermore, a valve such as a damper or flap, may be arranged at the tank collecting the discharge air of the cooling air, which opens this tank into the atmosphere when the first valve closes the connection between this tank and the connection line.

Both valves may be connected with each other by a linkage which is adapted to be moved as a function of the temperature of the supercharged air as the control magnitude thereof.

Accordingly, it is an object of the present invention to provide an air-cooled multi-fuel internal combustion engine which avoids by simple means the aforementioned shortcomings and drawbacks encountered in the prior art.

Another object of the present invention resides in an air-cooled internal combustion engine with supercharging, particularly a multi-fuel internal combustion engine of this type which facilitates the starting of the internal combustion engine at relatively cold outside temperatures, even with the use of poorly ignitable fuels.

A further object of the present invention resides in an air-cooled internal combustion engine with supercharging which better adapts the engine for multi-fuel operation.

A still further object of the present invention resides in a multi-fuel internal combustion engine of the type described above which insures reliable ignition of the fuel and good combustion in all rotational speed and load ranges.

Still another object of the present invention resides in an internal combustion engine of the type described above which is more efficient as regards preheating and cooling of the supercharged air under all operating conditions of the internal combustion engine.

Figure 2:
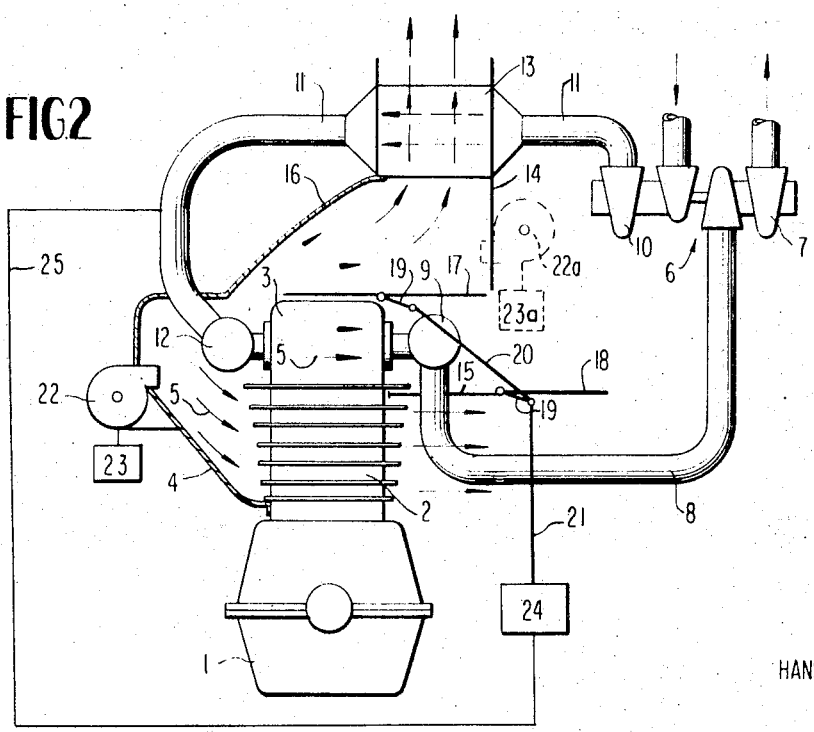

These and further objects, features, and advantages of the present invention will become more obvious from the following description when taken in connection with the accompanying drawing which shows, for purposes of illustration only, one embodiment in accordance with the present invention, and wherein:

FIG. 1 is a schematic view of an air-cooled multi-fuel internal combustion engine with supercharging during operation in idling and at partial load; and FIG. 2 is a schematic view of the multi-fuel internal combustion engine according to FIG. 1 during operation under full load.

Referring now to the drawing wherein like reference numerals are used throughout the two views to designate like parts, with the multi-fuel internal combustion engine illustrated in these two figures and designated therein by reference numeral 1, the cylinder block 2 and cylinder head 3 are cooled by means of air which is supplied or fed by blower (not shown) driven by the internal combustion engine and which is blown in the direction of arrows 5 on the inside of the housing 4 serving for the conductance of the cooling air. The air required for the combustion of the fuel is supercharged. For this purpose, an exhaust gas turbocharger generally designated by reference numeral 6 is provided whose turbine 7 is connected by means of the exhaust gas line 8 with the exhaust gas manifold 9 of the internal combustion engine 1. The supercharger 10 driven by the turbine 7 draws-in air out of the atmosphere and compresses the same through the line 11 into the manifold 12 on the inlet side of the internal combustion engine.

The heat-exchanger 13 is arranged in the line 11 which is connected by way of a connecting line 14 with a tank 15 arranged on the outlet side of the internal combustion engine 1 within the area of the cylinder head 3; the tank 15 thereby collects the discharge air leaving the cylinder head 3 and forming part of the air serving for the cooling of the internal combustion engine 1. A by-pass line 16 by-passing the cylinder head 3 terminates in the connecting line 14, through which a part of the cooling air flow without heat absorption at the internal combustion engine can reach directly the connecting line 14. A valve or flap 17 is arranged at the discharge of the line 16 in the connecting line 14, which in the one position, illustrated in FIG. 1, closes the connecting line 14 with respect to the line 16 and in the other position illustrated in FIG. 2, closes the tank 15 with respect to the connecting line 14. Furthermore, a valve or flap 18 is provided at the tank 15 which, in the position thereof according to FIG. 1, closes the tank 15 and in the position thereof according to FIG. 2, opens the tank 15 with respect to the atmosphere. Both valves 17 and 18 which may be constructed as conventional campers or flaps, are so connected with each other by means of levers 19 and linkage 20 that they can be shifted together in unison by means of the rod 21 from the position according to FIG. 1 into the position according to FIG. 2 and vice versa. Rod 21 may be connected with any desired control means of conventional construction and operating as a function of the control magnitude or magnitudes described herein.

A heating apparatus 22 of any conventional construction which is independent of the internal combustion engine 1, is arranged at the housing 4. In lieu thereof, such a heating apparatus 22a may also be arranged in the connecting line 14 as indicated in dash line.

During the starting operation of the internal combustion engine 1, during idling and at partial loads, the flaps 17 and 18 assume the position according to FIG. 1 whereby the temperature of the supercharged air serves as control quantity for the automatic actuation of the flaps by connection with rod 21, which may take place in any conventional manner, not forming part of the present invention and therefore not illustrated in detail herein. Reference numerals 24 and 25 schematically represent a control apparatus for controlling rod 21 in response to the temperature of the supercharged air in line 11. The heating apparatus 22 is also engaged, preferably automatically by conventional means and heats the cooling air within the housing 4 before it reaches the cylinder block 2 and the cylinder head 3 of the internal combustion engine 1, and thus heats the internal combustion engine. The heating apparatus 22 may also be controlled automatically by conventional means, for example, as a function of the outside temperature and/or as a function of the condition of the internal combustion engine, i.e., during idling and at lower rotational speeds of the latter. Since such control means are known as such, a detailed showing and description thereof is dispensed with herein. A conventional thermostat arrangement is schematically illustrated at 23 could be used to control heating apparatus 22. Reference numeral 23a schematically illustrates a corresponding thermostat arrangement for heating apparatus 22a. The part of the cooling air flowing over the cylinder head 3 is collected as heated-up discharge air in the tank 15 and is conducted through the connecting line 14 to the heat-exchanger 13. In the heat-exchanger 13, the supercharged air supplied by the supercharger 10 of the exhaust gas turbo-charger 6 is heated in the line 11 so that favorable prerequisites for the combustion of also poorly ignitable fuels are created in the multi-fuel internal combustion engine by the heated supercharged air. The arrangement of the heating apparatus 22 at the housing 4 favors a rapid heating-up of the entire internal combustion engine 1. If the internal combustion engine has reached its operating temperature, then heating apparatus 22 is disengaged, for example, is automatically turned off by the conventional thermostat means 23. The cooling air flowing over the cylinder head 3 then absorbs as discharge air additional air from the exhaust gas manifold 9 so that the supercharged air is well heated-up in the heat-exchanger 13.

As soon as the super-charged air is heated to such an extent that the ignition and combustion take place in the internal combustion engine in a favorable manner, the valves 17 and 18 are shifted during full load by means of the rod 21, the linkage 20 and the levers 19 through 90° into the position shown in FIG. 2. The flap 17 thereby closes the tank 15 with respect to the connecting line 14. The flap 18 opens the tank with respect to the atmosphere. The cooling air flowing over the cylinder head 3 as also the cooling air flowing through the cylinder block 2 reach the atmosphere as discharge air. In contradistinction thereto, a portion of the cooling air flows through the line 16 into the connecting line 14, by-passing the cylinder head 3, and from there to the heat-exchanger 13. Since this portion of the cooling air during the full load of the internal combustion engine is cooler than the supercharged air, the supercharged air flowing through the heat-exchanger 13 is cooled in an effective manner.

By an appropriate corresponding control of the valves 17 and 18, it is possible to so adjust the temperature of the portion of the discharge and/or feed air from the cooling air stream flowing through the heat-exchanger 13 that the temperature of the supercharged air remains always at the same level. It is, however, also possible to control the shifting of heating to cooling of the supercharged air and vice versa according to the pressure in the supercharged air duct, the fuel quantity, the rotational speed of the internal combustion engine and/or the temperature of the exhaust gases. Since such controls are known as such in the prior art and form no part of the present invention except in connection with the particular arrangement of the internal combustion engine, a detailed description thereof is dispensed with herein for the sake of brevity.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What I claim is:

1. An air-cooled internal combustion engine arrangement comprising:
   an air-cooled internal combustion engine,
   combustion air inlet means for communicating combustion air to said engine,
   cooling air means for supplying cooling air to said engine, said cooling air being discharged from adjacent said engine after cooling said engine as discharged cooling air,
   supercharger means for supercharging the combustion air,
   heat-exchanger means arranged in the combustion air inlet means between said supercharger means and said engine,
   connecting line means connecting said discharged cooling air to said heat-exchanger means,
   first valve means arranged in said connecting line means and movable between a first position preventing passage of the discharged cooling air to said heat-exchanger means to a second position communicating said discharged cooling air into said heat-exchanger means,
   and second valve means which operatively communicates said discharged cooling air to the atmosphere when the first valve means is in said first position.

2. An arrangement according to claim 1, characterized by heating means arranged in the flow of the discharged cooling air leading to the heat-exchanger means, said last-mentioned heating means being heatable by the exhaust gases of the internal combustion engine.

3. An air-cooled arrangement according to claim 2, characterized in that an exhaust gas manifold of the internal combustion engine is arranged in the flow of the discharged cooling air conducted to the heat exchanger means.

4. An arrangement according to claim 1, further comprising cooling air guide means arranged upstream of said engine for guiding the cooling air to said engine and a by-pass line connecting said cooling air guide means and said connecting line in by-passing relationship to said engine.

5. An arrangement according to claim 1, further comprising heating means arranged upstream of said engine for heating the cooling air supplied to the engine.

6. An arrangement according to claim 5, further comprising further heating means arranged in the flow of the discharged cooling air leading to the heat-exchanger means, said further heating means being heatable by the exhaust gases of the internal combustion engine.

7. An arrangement according to claim 6, wherein said further heating means includes the arrangement of an exhaust gas manifold of the internal combustion engine in the flow of the discharged cooling air being conducted to the heat-exchanger means.

8. An arrangement according to claim 5, further comprising control means for automatically turning on and off said heating means.

9. An arrangement according to claim 8, wherein said control means includes means for selectively turning on and off said heating means as a function of the outside temperature during the starting operation, during idling and at lower rotational speeds of the internal combustion engine.

10. An arrangement according to claim 1, further comprising heating means arranged in the flow of the discharged cooling air leading to the heat-exchanger means said heating means being heatable by the exhaust gases of the internal combustion engine.

11. An arrangement according to claim 10, wherein said heating means includes the arrangement of an exhaust gas manifold of the internal combustion engine in the flow of the discharged cooling air being conducted to the heat-exchanger means.

12. An air-cooled internal combustion engine arrangement comprising: an air-cooled internal combustion engine,
   combustion air inlet means for communicating combustion air to said engine,
   cooling air means for supplying cooling air to said engine, said cooling air being discharged from adjacent said engine after cooling said engine as discharged cooling air,
   supercharger means for supercharging the combustion air,
   heat-exchanger means arranged in the combustion air inlet means between said supercharger means and said engine,
   tank means for collecting said discharged cooling air,
   a connecting line connecting said tank means with said heat-exchanger means,
   cooling air guide means arranged upstream of said engine for guiding the cooling air to said engine,
   a by-pass line connecting said cooling air guide means and said connecting line in by-passing relationship to said engine,
   first valve means movable between a first position closing the connecting line with respect to the tank means and a second position closing the pass line with respect to said connecting line,
   and second valve means which in one position opens said tank means with respect to the atmosphere when the first valve means closes the connection between the tank means and the connecting line.

13. An arrangement according to claim 12, characterized in that the engine is operable as multi-fuel internal combustion engine.

14. An arrangement according to claim 12, characterized in that the supercharger means is driven by an exhaust gas turbine.

15. An arrangement according to claim 12, wherein said discharged cooling air flows by way of a cylinder head of said engine, and wherein said by-pass line is in by-passing relationship to said cylinder head.

16. An arrangement according to claim 12, wherein said first and second valve means are connected by a linkage means, and wherein automatic control means are provided for displacing said linkage means as a function of the temperature of the supercharged air.

18. An arrangement according to claim 12, further comprising heating means arranged upstream of said engine for heating the cooling air supplied to the engine.

18. An arrangement according to claim 12, further comprising heating means arranged downstream of said engine for heating the discharged cooling air.

19. An arrangement according to claim 18, characterized in that said heating means is operated at low external temperatures during the engine starting operation, in idling and at low rotational speeds of the internal combustion engine.

20. An arrangement according to claim 19, characterized by control means for automatically turning on and off said heating means.

21. An arrangement according to claim 20, wherein said control means includes means for selectively turning on and off said heating means as a function of the outside temperature during the starting operation, during idling and at lower rotational speeds of the internal combustion engine.

22. An arrangement according to claim 21, characterized by further heating means arranged in the flow of the discharged cooling air leading to the heat-exchanger means, said further heating means being heatable by the exhaust gases of the internal combustion engine.

23. An arrangement according to claim 22, characterized in that an exhaust gas manifold of the internal combustion engine is arranged in the flow of discharged cooling air conducted to the heat-exchanger means.

24. An air-cooled internal combustion engine arrangement comprising:
an air-cooled internal combustion engine,
combustion air inlet means for communicating combustion air to said engine,
cooling air means for supplying cooling air to said engine, said cooling air being discharged from adjacent said engine after cooling said engine as discharged cooling air,
supercharger means for supercharging the combustion air,
heat-exchanger means arranged in the combustion air inlet means between said supercharger means and said engine,
a connecting line for communicating a temperature changing medium to said heat-exchanger means for changing the temperature of the combustion air passing through said heat-exchanger means,
a first line conducting said discharged cooling air away from the engine,
a second line conducting atmospheric air which is unaffected by the heat of the engine,
first valve means movable between a first position communicating said connecting line with said first line and a second position communicating said connecting line with said second line,
and automatic valve means for automatically controlling said first valve means such that said first valve means is in said first position during starting and low speed operation of the engine and in said second position during high speed operation of the engine, whereby said combustion air is automatically heated during low speed operation and cooled during high speed operation of the engine.

25. An arrangement according to claim 24, wherein said engine is operable as multi-fuel internal combustion engine.

26. An arrangement according to claim 24, further comprising heating means arranged in the flow of said discharged cooling air for heating the discharged cooling air supplied to the heat-exchanger means.

27. An arrangement according to claim 26, wherein heat is supplied to said heating means from an exhaust gas manifold of the engine.

28. An arrangement according to claim 24, further comprising a second valve means having one position for communicating said discharged cooling air to atmosphere, and wherein said automatic valve control means includes means for moving said second valve means to said one position when said first valve means is in said second position.

29. An arrangement according to claim 28, further comprising heater means arranged upstream of said engine for heating the cooling air supplied to the engine during starting an initial low speed operation of the engine, whereby said discharged cooling air is heated to facilitate heating of the combustion air during starting operations.

30. An arrangement according to claim 29, further comprising further heating means arranged in the flow of said discharged cooling air for heating the discharged cooling air supplied to the heat-exchanger means.

31. An arrangement according to claim 30, wherein heat is supplied to said further heating means from an exhaust gas manifold of the engine.

32. An arrangement according to claim 24, wherein the supercharger means is driven by an exhaust gas turbine of the engine.

33. An arrangement according to claim 24, further comprising heater means arranged upstream of said engine for heating the cooling air supplied to the engine during starting and initial low speed operation of the engine, whereby said discharged cooling air is heated to facilitate heating of the combustion air during starting operations.

* * * * *